(12) United States Patent
Dunjic et al.

(10) Patent No.: US 11,620,636 B2
(45) Date of Patent: Apr. 4, 2023

(54) TOUCHLESS PAYMENTS AT POINT-OF-SALE TERMINALS

(71) Applicant: The Toronto-Dominion Bank, Toronto (CA)

(72) Inventors: Milos Dunjic, Oakville (CA); David Samuel Tax, Toronto (CA); Vipul Kishore Lalka, Oakville (CA); Bryan Michael Gleeson, Bowmanville (CA); Jeffrey Aaron Ecker, Toronto (CA); Derek Richard Castell, Hamilton (CA); Anthony Haituyen Nguyen, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 90 days.

(21) Appl. No.: 17/061,740

(22) Filed: Oct. 2, 2020

(65) Prior Publication Data
US 2022/0108303 A1 Apr. 7, 2022

(51) Int. Cl.
G06Q 20/34 (2012.01)
G06Q 20/20 (2012.01)
H04L 9/06 (2006.01)
H04L 9/32 (2006.01)

(52) U.S. Cl.
CPC ......... *G06Q 20/352* (2013.01); *G06Q 20/204* (2013.01); *H04L 9/0643* (2013.01); *H04L 9/3247* (2013.01); *H04L 2209/56* (2013.01)

(58) Field of Classification Search
None
See application file for complete search history.

(56) References Cited

U.S. PATENT DOCUMENTS

| 8,380,177 | B2 | 2/2013 | Laracey | |
| 8,712,912 | B2 | 4/2014 | Carlson et al. | |
| 8,714,439 | B2 | 5/2014 | Brendell et al. | |
| 9,875,469 | B1* | 1/2018 | Chin | G06Q 20/3276 |
| 10,580,049 | B2 | 3/2020 | Graylin | |
| 10,586,227 | B2* | 3/2020 | Makhdumi | G06Q 20/3276 |

(Continued)

FOREIGN PATENT DOCUMENTS

KR 1020200071634 A 6/2020

OTHER PUBLICATIONS

Racanelli, Helen, "'Credit and debit card "tap to pay" limits are now higher. Should you worry?'", Aug. 21, 2020, all (Year: 2020).*

*Primary Examiner* — Christopher Bridges
(74) *Attorney, Agent, or Firm* — Rowand LLP (57) ABSTRACT

In some implementations, a method of providing contactless payments at a point of sale terminal includes: causing a point-of-sale terminal processing a transaction to display a machine-readable code, the machine-readable code encoding a web address; receiving a request from a device that scanned the machine-readable code, the request received at the web address; in response to receiving the request, causing the device that scanned the machine-readable code to output an interface that includes a prompt for input required to complete the transaction; receiving a response to the prompt; and sending an indication of the response to the prompt to the point-of-sale terminal to allow for completion of the transaction based on the response at the point-of-sale terminal through use of a physical token at the point-of-sale terminal.

18 Claims, 7 Drawing Sheets

(56) References Cited

U.S. PATENT DOCUMENTS

| | | |
|---|---|---|
| 10,713,641 B1 | 7/2020 | Nicolau et al. |
| 11,068,867 B1 * | 7/2021 | Tucker .................. G06Q 30/04 |
| 11,130,042 B2 * | 9/2021 | Tran ..................... H04W 84/18 |
| 2004/0083170 A1 | 4/2004 | Bam et al. |
| 2012/0209749 A1 | 8/2012 | Hammad et al. |
| 2016/0275471 A1 | 9/2016 | Rajamannar |
| 2017/0068949 A1 * | 3/2017 | Brendell ............... G06Q 20/40 |
| 2017/0228719 A1 | 8/2017 | Jamieson et al. |
| 2019/0205865 A1 * | 7/2019 | Jamkhedkar ..... G06K 19/06037 |
| 2019/0372993 A1 * | 12/2019 | Dunjic ................. H04L 9/3268 |
| 2021/0004803 A1 * | 1/2021 | Rule .................... G06Q 20/352 |

\* cited by examiner

TOUCHLESS PAYMENTS AT POINT-OF-SALE TERMINALS

TECHNICAL FIELD

The present application relates to value transfer cards and, more particularly, to systems and methods for allowing a customer to process a payment at a point-of-sale terminal without contacting the point-of-sale terminal.

BACKGROUND

Due to COVID-19, there is an increased desire among customers to avoid contacting surfaces that numerous individuals may have already touched. Point of Sale (POS) terminals often require customer interaction in order to complete a sale. For example, POS terminals often prompt for input of a voluntary amount, such as a tipping amount. Often, even though a customer may have a payment card that allows for contactless payments, they may need to contact the POS terminal in order to complete a purchase by, for example, inputting a tipping amount.

Further, point-of-sale terminals that require customer physical interaction may also be difficult to operate for some customers. For example, visually impaired users may have difficulty operating point-of-sale terminals that may, for example, require input at a touchscreen display.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

In an aspect, a processor-implemented method is disclosed. The method may be performed by a server. The method may include: causing a point-of-sale terminal processing a transaction to display a machine-readable code, the machine-readable code encoding a web address; receiving a request from a device that scanned the machine-readable code, the request received at the web address; in response to receiving the request, causing the device that scanned the machine-readable code to output an interface that includes a prompt for input required to complete the transaction; receiving a response to the prompt; and sending an indication of the response to the prompt to the point-of-sale terminal to allow for completion of the transaction based on the response at the point-of-sale terminal through use of a physical token at the point-of-sale terminal.

Conveniently, in this way, a customer may have a true touchless experience at a point-of-sale terminal. That is, the customer may complete a transaction without ever having to contact the POS terminal. The customer may, instead, provide input responsive to any requisite prompts on their own device, such as on a mobile device, but the POS terminal may still be used for processing the transaction after such input has been received. For example, a tipping amount may be input at the customer's device and provided to the POS terminal so that a customer may then tap a payment token, such as a near field communication (NFC) enabled value transfer card, at the POS terminal to complete the transaction.

In some implementations, the machine-readable code may encode a base amount of a transaction. The request from the device may reference the base amount of the transaction and the interface may indicate the base amount of the transaction.

In some implementations, the machine-readable code may encode a transaction identifier. The request from the device may reference the transaction identifier. The indication of the response to the prompt may be sent to the point-of-sale terminal based on the transaction identifier.

In some implementations, the machine-readable code may encode a hash and a digital signature. The request may include the hash and digital signature and the method may further include verifying the request based on the hash and the digital signature.

In some implementations, the machine-readable code may further encode random data. The request may further include the random data and the method may further include verifying that the request is not associated with a replay attack based on the random data.

In some implementations, the physical token may include one or more of: a payment card and a mobile device having a representation of a payment card stored thereon.

In some implementations, the prompt may be for input of an optional amount to be added to a base amount to obtain a total amount prior to completing the transaction. The indication of the response to the prompt may indicate one or both of the optional amount or the total amount to allow the point-of-sale terminal to indicate that the transaction is to be for the total amount prior to completing the transaction using the physical token.

In some implementations, the method may include: receiving, from the point-of-sale terminal, an indication of a base amount of the transaction; determining, based on the base amount of the transaction, that touchless payment is available, and wherein the machine-readable code is caused to be displayed in response to determining that touchless payment is available.

In some implementations, the interface that includes the prompt may generate the prompt audibly to assist a visually-impaired operator of the device.

In some implementations, the method may further include receiving, from the point-of-sale terminal, a request for the indication of the response to the prompt. The indication of the response to the prompt may be sent to the point-of-sale terminal in response to receiving the request for the indication of the response to the prompt.

In yet another aspect, a server is disclosed. The server may include a communications module. The server may include a processor coupled with the communications module. The server may include a memory coupled to the processor and storing processor-executable instructions which, when executed by the processor, configure the server to perform a method described herein.

In another aspect, a computer-readable storage medium may be provided. The computer-readable storage medium may include processor-executable instructions which, when executed, configure a processor to perform a method described herein.

In yet another aspect, a method performed by a point-of-sale terminal is disclosed. The method may include: obtaining a machine-readable code, the machine-readable code encoding a web address; displaying the machine-readable code; receiving, from a server associated with the web address, an indication of a response to a prompt; and displaying a transaction completion prompt based on the indication of the response, the transaction completion prompt prompting for completion of the transaction through use of a physical token at the physical token reader.

In some implementations, the method may further include receiving input of a base amount of the transaction through the input module. The machine-readable code may encode the base amount of a transaction.

In some implementations, the machine-readable code may encode a transaction identifier.

In some implementations, the machine-readable code may encode a hash and a digital signature.

In some implementations, the machine-readable code may encode random data.

In some implementations, the physical token may include one or more of: a payment card and a mobile device having a representation of a payment card stored thereon.

In some implementations, the web address may be associated with an interface that prompts for input of an optional amount to be added to a base amount to obtain a total amount prior to completing the transaction. The indication of the response to the prompt may indicate one or both of the optional amount or the total amount. The method may further include displaying the total amount prior to completing the transaction using the physical token.

In some implementations, obtaining the machine-readable code may include: sending the base amount to a server; and receiving the machine-readable code from the server.

In some implementations, the method may include determining, based on the base amount of the transaction, that touchless payment is available. The machine-readable code may be displayed in response to determining that touchless payment is available.

In some implementations, the method may further include: receiving input via the input module, the input indicating readiness to complete the transaction; and in response to receiving the input indicating readiness to complete the transaction, send a request for the indication of the response to the prompt to the server, and wherein the indication of the response to the prompt is received in response the request for the indication of the response to the prompt.

In yet another aspect, a point-of-sale terminal is described. The point-of-sale terminal may include a physical token reader. The point-of-sale terminal may include a communications module. The point-of-sale terminal may include a display module. The point-of-sale terminal may include an input module. The point-of-sale terminal may include a processor coupled with the communications module, the input module, the display module and the physical token reader. The point-of-sale terminal may include a memory coupled to the processor and storing processor-executable instructions which, when executed by the processor, configure the point-of-sale terminal to perform a method described herein.

In another aspect, a computer-readable storage medium may be provided. The computer-readable storage medium may include processor-executable instructions which, when executed, configure a processor to perform a method described herein.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

Example embodiments of the present application are not limited to any particular operating system, system architecture, mobile device architecture, server architecture, or computer programming language.

Physical tokens can be used for making purchases at a point-of-sale terminal. Such physical tokens may be configured for tap-style payments in which the physical token is placed in a communication range of a physical token reader to allow physical token data to be read from the physical token. By way of example, physical tokens may include any one or a combination of: payment cards (which may also be referred to as value transfer cards) and computing devices having a representation of a payment card stored thereon. By way of example, the physical token may be a mobile device having a mobile wallet that stores a representation of a payment card.

A physical token may be connected to one or more accounts (such as banking accounts) that store data and/or resources accessible to the cardholder. By way of example, the physical token may be associated with a bank account and/or a credit card account. The physical token may act as a credit card or a debit card.

The physical token may be configured for near-field communication (NFC) payment processing or for wireless communication-based payment processing of another type. Notably, conventional POS terminals that interact with such physical tokens often do not provide a true touchless experience. For example, while a customer may use the physical token to submit payment through a tap of the physical token at the POS terminal, the customer may be required to contact the POS terminal in order to provide other input. For example, a conventional POS terminal may prompt the customer for input of an optional payment amount, such as a tip, or may prompt the customer for input of contact information such as an email address to which a receipt may be delivered. Conveniently, one or more POS terminals described herein may provide at least some customers with a true touchless experience in which the customer is able to process the transaction, including responding to any requisite prompts, without contacting the POS terminal. As will be described below, in at least some implementations, a customer may provide input responsive to such prompts on their own device and the responses may be sent to the POS terminal so that the transaction may then be completed at the POS terminal.

Figure 1:
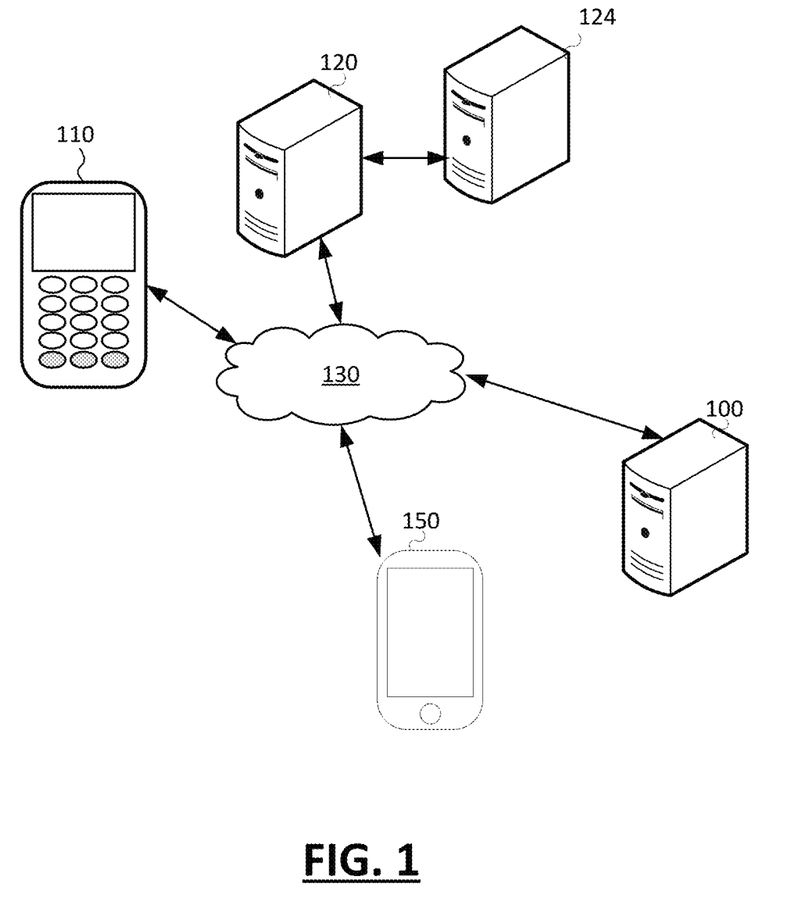
FIG. 1 is a schematic diagram illustrating an operating environment of an example embodiment.

FIG. 1 is a schematic operation diagram illustrating an operating environment of an example embodiment.

As noted previously, in many conventional systems customers may be required to provide input at a POS terminal 110 in order to complete a transaction. As illustrated, however, in FIG. 1, in order to facilitate true touchless payments, the POS terminal 110 may communicate with a touchless transfer server 100. Such communication may be by way of the network 130. The touchless transfer server 100 may also communicate with a customer device 150 and such communication may be by way of a network, such as the network 130.

The customer device 150 is a computing device that is associated with a customer. By way of example, the customer device 150 may include any one or more of: a mobile device, a tablet computer, a laptop computer, a wearable computer, or a computing device of another type.

As will be described in greater detail below, the touchless transfer server 100 may interact with the customer device 150 to allow a customer to provide input at the customer device 150 so that at least some input need not be provided at the POS terminal 110 directly. Accordingly, the touchless transfer server 100 may be or may be associated with a web server.

The touchless transfer server 100 may also communicate the input to the POS terminal 110 to allow the POS terminal 110 to process a transaction that is based on the received input. Such communication may, for example, be by way of a network, such as the network 130.

As illustrated, a point-of-sale (POS) terminal 110 may communicate with a transfer rail 120 which relays transaction data to an appropriate issuer system 124. Such communication may be via a network, such as the network 130. The transfer rail 120 may also be referred to as a payment rail.

The point-of-sale terminal is associated with an acquirer and the communication between the POS terminal 110 and the transfer rail 120 may be by way of a back-end acquirer system. The POS terminal 110 may be located at a location that is associated with a merchant. By way of example, the merchant may be a store, restaurant, gym, etc. The acquirer is a merchant bank that accepts deposits associated with transactions made at the point-of-sale terminal and facilitates settlement and deposit of those deposits into an account associated with the merchant.

While a single transfer rail 120 is illustrated in FIG. 1, in practice the POS terminal 110 may communicate with multiple transfer rails. By way of example, the transfer rail 120 may include any one or a combination of Amex™, Visa™ and/or Mastercard™. Other transfer rails may also be used. The POS terminal and/or a back-end acquirer system in communication with the POS terminal may, after obtaining data from a physical token, such as a value transfer card or a mobile device having a representation of a payment card which has engaged a physical token reader provided at the POS terminal, determine which of the transfer rails is to be used. For example, the POS terminal/acquirer system may determine that the physical token is associated with Visa™ and may, in response, select the Visa™ payment rail or it may, instead, determine that the physical token is associated with Mastercard™ and select the Mastercard™ payment rail.

After a transfer rail is identified, the POS terminal/acquirer system sends the transfer rail a message. The message may be sent through a network, such as the network 130. The message includes a value amount representing an amount of value that is to be transferred to complete a transaction and physical token data such as a primary account number (PAN) associated with a physical token. The transfer rail identifies an associated issuer based on the physical token data and communicates with the identified issuer to process the transaction. More particularly, the transfer rail 120 routes the message received from the POS terminal to an issuer system 124 for the identified issuer. The issuer system then determines whether the transaction is approved or denied based on pre-defined rules. The rules may, for example, consider any one or more of: whether the cardholder has available funds, whether the merchant is of a type that is permitted, whether the transaction violates any spending limits, etc.

When the issuer system determines whether to approve or deny the transaction, it sends a message indicating the result of this determination to the POS terminal 110 via the transfer rail 120. The result may then be displayed or otherwise output at the POS terminal 110.

The issuer system 124, point-of-sale terminal 110, customer device 150, touchless transfer server 100, and the transfer rail 120 may be in geographically disparate locations. Put differently, each of issuer system 124, point-of-sale terminal 110, customer device 150, touchless transfer server 100, and the transfer rail 120 may be remote from others of the issuer system 124, point-of-sale terminal 110, customer device 150, touchless transfer server 100, and the transfer rail 120.

The issuer system 124, point-of-sale terminal 110, customer device 150, touchless transfer server 100, and the transfer rail 120 may each be both a computer system and a computing device.

The network 130 is a computer network. In some embodiments, the network 130 may be an internetwork such as may be formed of one or more interconnected computer networks. For example, the network 130 may be or may include an Ethernet network, an asynchronous transfer mode (ATM) network, a wireless network, or the like. Additionally, or alternatively, the network 130 may be or may include one or more payment networks. The network 130 may, in some embodiments, include a plurality of distinct networks. For example, communications between certain of the computer systems may be over a private network whereas communications between other of the computer systems may be over a public network, such as the Internet.

Figure 2:
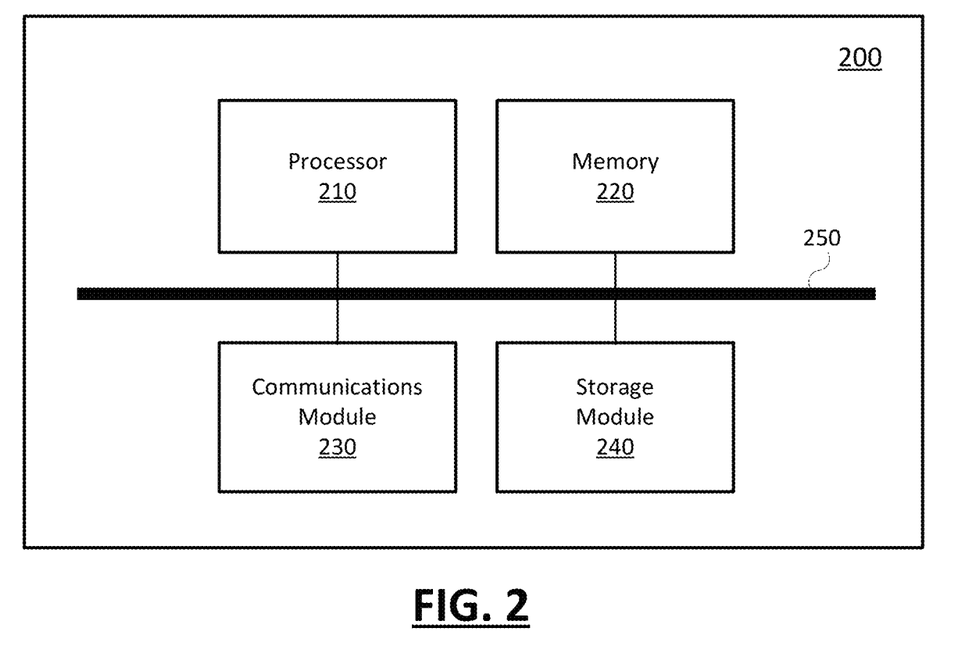
FIG. 2 is high-level schematic diagram of a computing device.

Referring now to FIG. 2, a high-level operation diagram of an example computing device 200 will now be described. The example computing device 200 may be exemplary of the issuer system 124, point-of-sale terminal 110, customer device 150, touchless transfer server 100, and/or transfer rail 120.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function may be performed by the memory 220 and/or by the processor 210 in concert with the communications module 230 such as, for example, if data is stored remotely. The storage module may also be referred to as a data store.

Software comprising instructions is executed by the processor 210 from a computer-readable medium. For example, software may be loaded into random-access memory from persistent storage of the memory 220. Additionally, or alternatively, instructions may be executed by the processor 210 directly from read-only memory of the memory 220.

The computing device 200 will include other components apart from those illustrated in FIG. 2 and the specific component set may differ based on whether the computing device 200 is operating as the issuer system 124, point-of-sale terminal 110, customer device 150, touchless transfer server 100, and/or the transfer rail 120. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Where the computing device 200 is operating as the POS terminal 110, the computing device 200 may include a physical token reader. The physical token reader is configured for reading a physical token such as a value transfer card or a mobile device having a representation of a value transfer card stored thereon. The physical token reader may be or include a card slot which facilitates communication with the physical token through physical contact and/or a contactless reader such as a near field communication (NFC) reader which may facilitate communication with the physical token through communication protocols that do not rely on physical contact with the physical token.

As noted above, the computing device 200 may include one or more input modules and/or one or more output modules. For example, where the computing device 200 is operating as the POS terminal 110 it may include one or more input modules such as a touchscreen display and/or a keypad that may be configured to receive user input. Even where the POS terminal 110 is configured for providing true touchless payments in which a customer does not need to touch the POS terminal 110, the input modules may be used by an operator, for example. Where the computing device 200 is operating as the POS terminal 110, it may also include a display module which is used for displaying a user interface that facilitates payment processing.

When the computing device 200 is operating as the customer device 150, the input modules may include a camera or scanner than may be used to scan a machine-readable code as will be explained more fully in the discussion of FIGS. 5 to 7 below.

Figure 3:
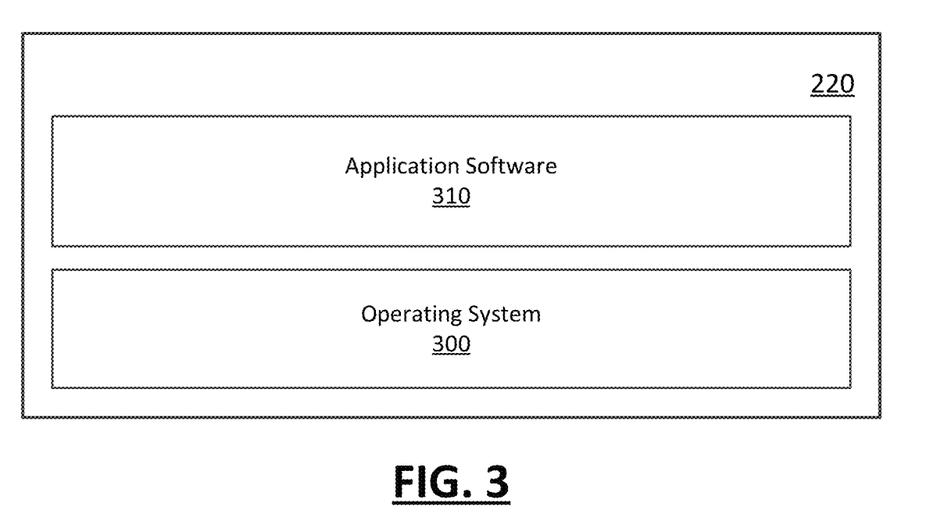
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application software 310.

The operating system 300 is software. The operating system 300 allows the application software 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application software 310 adapts the example computing device 200, in combination with the operating system 300, to operate as a device performing a particular function. For example, the application software 310 may cooperate with the operating system 300 to adapt a suitable embodiment of the example computing device 200 to operate as the issuer system 124, point-of-sale terminal 110, customer device 150, touchless transfer server 100, and/or the transfer rail 120.

While a single application software 310 is illustrated in FIG. 3, in operation the memory 220 may include more than one application software 310 and different application software 310 may perform different operations.

Figure 4:
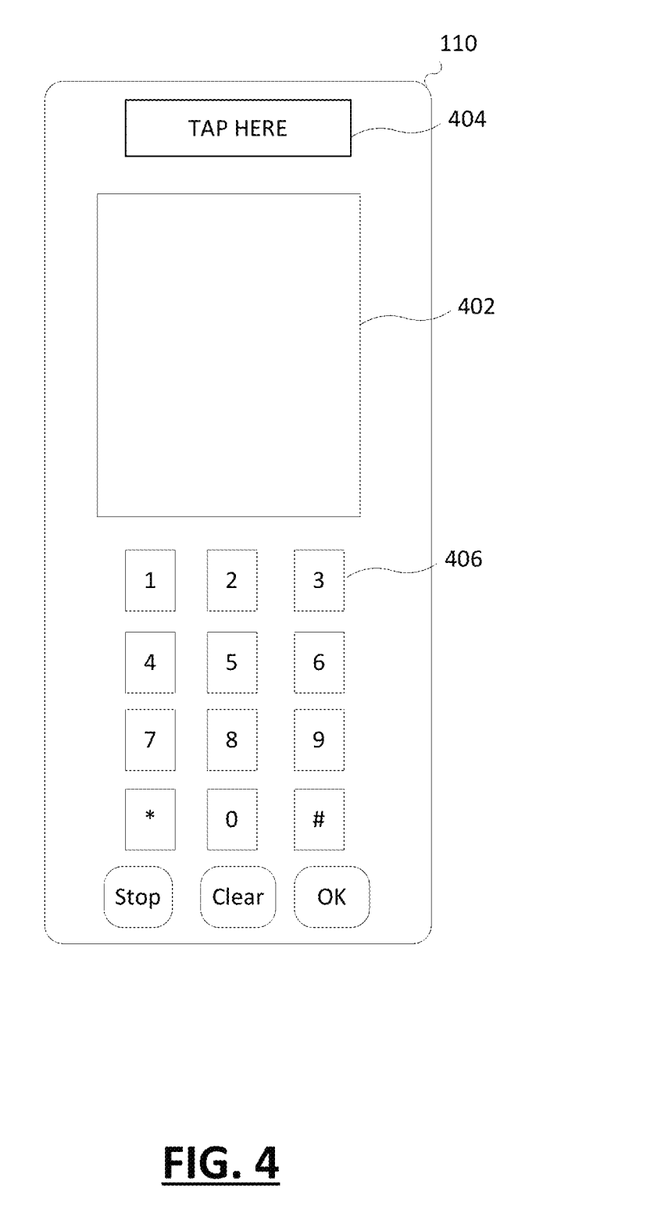
FIG. 4 shows an example point-of-sale terminal.

Referring now to FIG. 4, an example POS terminal 110 is illustrated. The POS terminal includes a physical token reader which, in the example, includes a wireless physical token reader configured for near field communications. The physical token reader may be used by tapping a physical token at a particular region 404 of the POS terminal 110. The particular region 404 is a sensing region. That is, when the physical token is placed at or near the particular region, the POS terminal 110 is able to communicate with the physical token to obtain physical token data.

The POS terminal 110 includes one or more output modules. In the example, the output modules include a display module 402. The display module 402 may, in at least some implementations, be a touchscreen display. In such cases, the display module 402 is both an output module and an input module.

The POS terminal 110 may include an input module of another type instead of or in addition to a touchscreen display. By way of example, the displayed POS terminal 110 includes a keypad 406. The input module may be used by an operator in order to setup a transaction. By way of example, the operator may input a base amount of a transaction. In some instances, the POS terminal may include or be associated with a scanner such as a bar-code reader which may be used to scan bar-codes that are displayed on tags associated with merchandise. In such instances, the operator may not input the base amount of the transaction directly; the base amount may be determined by a computer having access to price data.

By way of further example, in some instances, the POS terminal 110 may be associated with a computer system which allows an operator to input order information that may be used to calculate a base amount that is provided directly to the POS terminal 110. For example, the computer system may be a merchant terminal that may allow an operator to select items for an order from a predefined list, such as a list associated with a menu, and the merchant terminal may then calculate a base amount for a transaction and send it to the POS terminal.

The POS terminal 110 may, in some instances, include other physical token readers apart from the wireless physical token reader. For example, a card slot may be included and may be arranged so that when a value transfer card is inserted in the card slot, one or more pins or pads associated with the card may align with pads or pins provided in the POS terminal 110 that are intended for reading data from the card.

By way of further example, in some instances, the physical token readers may include a magnetic reader which is configured for reading data from a magnetic strip associated with a value transfer card.

Figure 5:
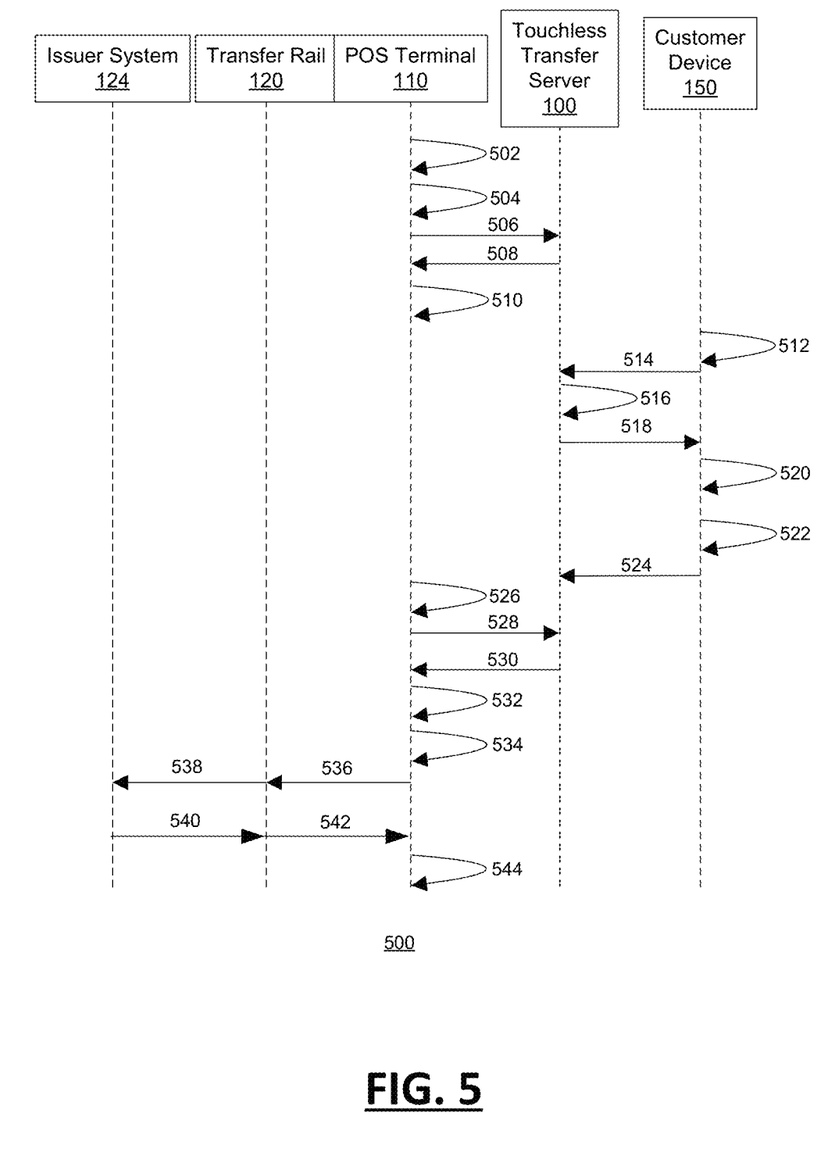
FIG. 5 shows a sequence diagram illustrating messages exchanged between systems illustrated in FIG. 1.

Reference is now made to FIG. 5. FIG. 5 illustrates a sequence diagram 500, similar to a Unified Modelling Language (UML) sequence diagram, that shows how the customer device 150, touchless transfer server 100, POS terminal 110, transfer rail 120 and the issuer system 124 may communicate in some embodiments, and, in particular, depicting messages exchanged therebetween in processing a transaction. That is, such messages may be used for initiating a data transfer or initiating a transfer of value.

The operations that are performed by the customer device 150, touchless transfer server 100, POS terminal 110, transfer rail 120 and the issuer system 124 in exchanging the messages illustrated in the sequence diagram and/or in performing various operations referred to herein, may be performed by processors executing processor-executable instructions stored in a memory. The processors may be coupled to a communications module which may be used in sending and/or receiving the various messages.

In the following description of the sequence diagram 500, discussion is made of various messages being sent and received via a computer network such as, for example, network 130. In some embodiments, the exchanged messages may be implemented as messages. However, in other embodiments, some or all of the illustrated messages may not correspond to messages per se when sent over the computer network but may instead be implemented using techniques such as for example remote procedure call (RPC) and/or web services application programming interfaces (APIs). For example, it may be that various message pairs illustrated in FIG. 5 correspond to an RPC or a web service API call and a reply or callback in response to that call.

As illustrated, at the beginning of sequence, at 502, the POS terminal 110 may receive transaction setup data, such as a base amount of a transaction. The base amount may be received through an input module that is configured for receiving operator input. The input module may be provided on the POS terminal or on an associated system that is communicably coupled with the POS terminal 110. By way of example, in some implementations, the base amount may be received via direct input on a keypad 406 (FIG. 4) provided at the POS terminal. In other instances, another point of sale system may receive input that may be used to determine the base amount (e.g., by scanning a bar code or by selecting an item for purchase from a list of available items) and the base amount may then be sent to the POS terminal 110. A base amount of a transaction may be an amount of a transaction that a customer is required to pay and the base amount of the transaction may exclude an optional amount (also known as a voluntary amount and/or a variable amount), such as an amount for a tip.

In some implementations, the POS terminal 110 may only allow a customer to use their customer device 150 as part of the transaction if touchless payments are likely to be available. For example, in some instances, a customer may only be permitted to use tap-style payments for transactions that are under a certain threshold. In at least some such implementations, the POS terminal 110 may determine at 504, based on the base amount of the transaction, whether touchless payment is available.

By way of example, in some instances, tap-style or other touchless payments may only be permitted for transactions that are under a threshold amount. The POS terminal 110 may, therefore, compare the base amount, or an amount that is based on the base amount, to a threshold such as $200. If the amount exceeds the threshold (i.e., if touchless payment is not available), then 506 to 530 may not be performed and the transaction may instead be completed in a traditional manner since the customer may be required to contact the POS terminal anyway in order to input a credential, such as a personal identification number (PIN). Put differently, if the POS terminal 110 determines that the customer is required or is likely to be required to contact the POS terminal 110 as part of an authentication procedure, then the operations that allow a customer device 150 to be used in place of the POS terminal may not be performed.

As noted above, in assessing whether the customer is likely to be required to contact the POS terminal 110 for authentication purposes, the POS terminal may consider the base amount of the transaction. The base amount may, prior to the comparison, include or be adjusted to include other non-optional amounts, such as a tax amount. The base amount may, prior to the comparison, also be adjusted to include an expected optional amount. For example, the expected optional amount may be determined based on a typical rate, such as a typical tipping rate. The typical tipping rate may be, for example, 15%, 18%, 20%, or another optional amount. The typical rate may be determined automatically in some implementations; for example, based on past transactions at the same merchant or same POS terminal 110 or in the same geographic region (e.g., the same country). The adjustment to the base amount to account for such amounts is to reduce the likelihood that a transaction that initially was less than a threshold for which contact with the POS terminal for authentication purposes is not required will exceed the threshold after user input of an optional amount, such as a tip, is received. Put differently, this is to attempt to avoid a scenario in which a customer device 150 is used to receive input of a tip or another optional amount and then the customer is required to contact the POS terminal 110 for authentication purposes.

In some implementations, 504 may not be performed as a precondition to 506 and onward. Rather, the POS terminal 110 may allow customers to use a customer device 150 during the transaction even when the customer will be required to contact the POS terminal for authentication purposes. In such implementations, the use of the customer device 150 may reduce interactions with the POS terminal 110 by the customer even if interactions are not entirely eliminated.

The POS terminal 110 may then obtain and display a machine-readable code. In at least some implementations, the POS terminal 110 may do so in response to determining that touchless payment is available (at 504).

In some implementations, the POS terminal 110 may obtain the machine-readable code from the touchless transfer server 100. For example, the POS terminal 110 may send a message 506 to the touchless transfer server 100. The message 506 may be referred to as a code request message. The message 506 may include an indication of the base amount of transaction. The message 506 may include one or more identifier such as a point-of-sale terminal identifier and/or a merchant identifier. The message 506 may also include random data, such as a random number which may be produced by a random number generator.

The touchless transfer server 100 receives the message 506 which includes the base amount of the transaction. In response to receiving the message 506, the touchless transfer server 100 generates a machine-readable code based on the contents of the message 506.

The machine-readable code may, in some implementations, be a quick response (QR) code. The machine-readable code may encode various data. For example, the machine-readable code may encode the base amount of the transaction. The machine-readable code may encode a transaction identifier. The machine-readable code may encode a point-of-sale terminal identifier and/or a merchant identifier. The machine-readable code may include random data such as the random data provided in the message 506.

The machine-readable code may encode a link such as, for example, a web address. The web address is an address associated with a web server that is provided by or is associated with the touchless transfer server 100. The web address may be a uniform resource locator (URL). The web address may be associated with an interface. That is, the web address may be an address for a web server that serves the interface to a device that has scanned the machine-readable code.

The machine-readable code may encode security or verification data. For example, the machine-readable code may encode a hash. The touchless transfer server 100 may generate the hash based on other data encoded in the machine-readable code. For example, the hash may be generated based on any one or a combination of: the link/web address, the base amount of the transaction, the point-of-sale terminal identifier and/or a merchant identifier, the transaction identifier and/or the random data.

The machine-readable code may be digitally signed by the touchless transfer server 100 and/or may encode a digital signature.

In some implementations, at least some of the data that is encoded in the machine-readable code may be encoded as parameters associated with the web address that is encoded in the machine-readable code. For example, any one or a combination of: the hash, the base amount of the transaction, the point-of-sale terminal identifier, the merchant identifier, the transaction identifier, the random data and/or the digital signature may be encoded as parameters, such as URL parameters, for the URL. Conveniently, in this way, when a customer scans the machine-readable code with a customer device 150, the customer device 150 may be directed to the web address associated with the touchless transfer server 100 and may pass the web address such data as parameters.

The touchless transfer server 100 may, after preparing the machine-readable code, send a message 508 to the POS terminal 110. The message 508 includes the machine-readable code. In sending the machine-readable code to the POS terminal 110, the touchless transfer server 100 causes the machine-readable code to be displayed at the POS terminal 110. The POS terminal 110 receives the message 508 and, in doing so, receives the machine-readable code. The POS terminal 110 may, at 510, display the machine-readable code at a display module 402 (FIG. 4) associated with the POS terminal 110.

The operator of the POS terminal 110 may then ask a customer to scan or read the machine-readable code using a customer device 150. A customer may point a camera or other scanner associated with the customer device 150 at the displayed machine-readable code while a reader application is enabled on the customer device 150. The customer device 150 at 512 obtains a representation of the machine-readable code. That is, the reader application may decode the machine-readable code in order to obtain data contained therein. In doing so, the reader application may identify the web address included in the machine-readable code. The reader application may then provide a selectable option to activate the web address or it may automatically activate the web address.

The customer device 150 which scanned the machine-readable code, may then send a message 514 to the touchless transfer server 100. The message may be a request to retrieve content and, more particularly, a request to retrieve an interface. The request may be in the form of an HTTP GET in some implementations. The request may be sent by a web browser associated with the customer device 150 in at least some implementations. For example, the reader application may pass a URL and any associated URL parameters decoded from the machine-readable code to the web browser which then uses the URL, complete with any parameters, to retrieve the interface.

The touchless transfer server 100 receives the message 514. That is, the touchless transfer server 100 receives a request from the customer device 150 for the interface and receives any data that may be passed to the touchless transfer server 100 as, for example, URL parameters. Accordingly, the request received at the touchless transfer server 100 may reference any one or a combination of: the base amount of the transaction, the transaction identifier, the hash, the digital signature, the random data, the point-of-sale identifier, and/or the merchant identifier.

In some implementations, in response to receiving the message 514, the touchless transfer server 100 may, at 522, verify the message 514. That is, the touchless transfer server 100 may verify the request. Such verification may be based on the hash, the digital signature and/or the random data. The verification may, for example, ensure that the request is not associated with a replay attack, that the data has not been tampered with and/or that the request was generated based on an authorized machine-readable code. The verification that the request was generated based on an authorized machine-readable code may be based on the digital signature. That is, the touchless transfer server 100 may verify that the signature is a valid signature. The verification that the request was not associated with a replay attack may rely on the random data. The hash may be used to verify that the data has not been tampered with.

After the touchless transfer server 100 verifies the request and, in response to receiving the request, the touchless transfer server may cause the device that scanned the machine-readable code to output an interface that includes a prompt for input required to complete the transaction. More specifically, the touchless transfer server 100 sends a message 518 to the customer device 150. The message may include the interface.

Figure 8:
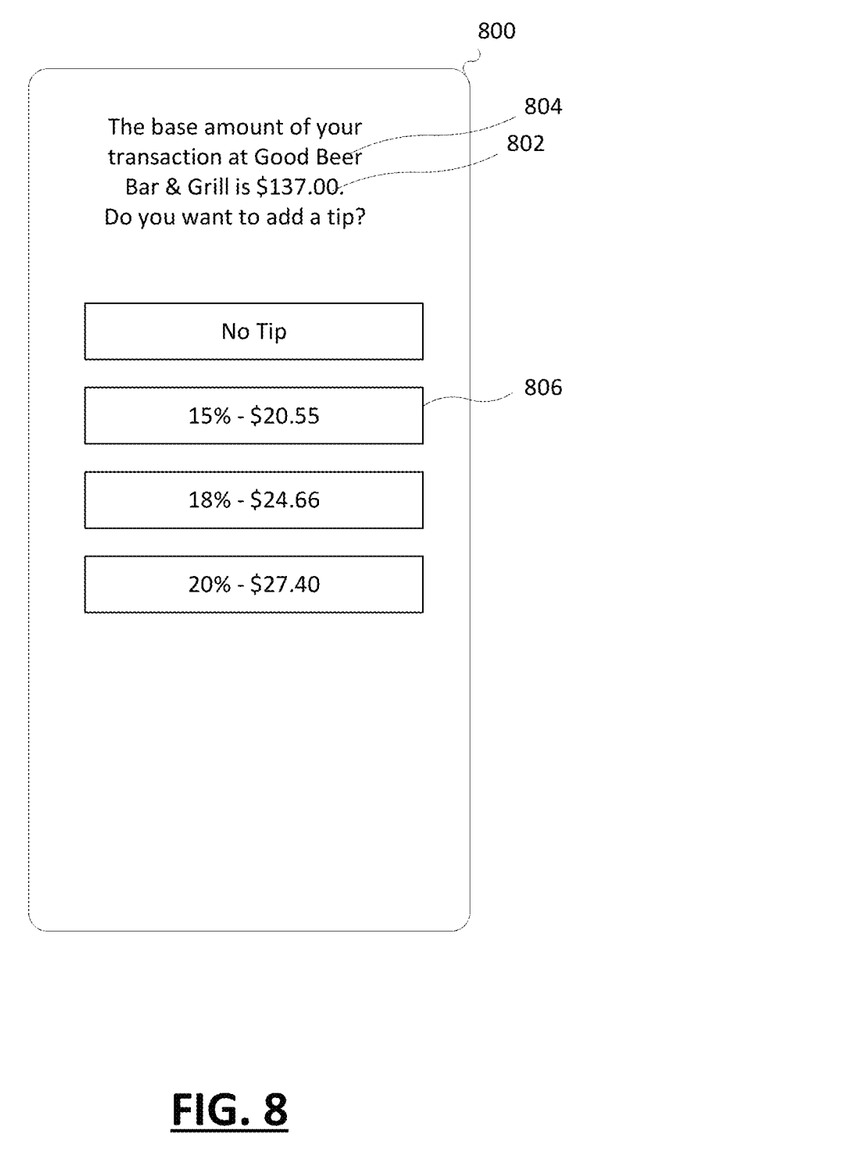
FIG. 8 shows an example interface that may be displayed on a customer device.

The interface may be a web page and may be displayed in a web browser on the customer device 150. An example interface 800 is illustrated in FIG. 8. The interface may include a base amount indicator 802 indicating the base amount of the transaction and/or a merchant indicator 804 indicating a merchant associated with the transaction as indicated by the merchant identifier.

The interface may be a generic interface that is the same for all merchants or a plurality of merchants or it may be a merchant-specific interface that is applicable for a particular merchant. For example, while not illustrated in FIG. 8, the interface 800 may include a logo for the merchant. By way of example, the interface 800 may be retrieved by the touchless transfer server 100 from a data store or memory based on the merchant identifier.

The interface may include a prompt 806. The prompt may, as illustrated in FIG. 8, be a prompt for input of an optional amount to be added to the base amount to obtain a total amount prior to completing the transaction.

In some implementations, the interface, which may include the prompt, may generate the prompt audibly to assist a visually-impaired operator of the customer device 150. That is, the interface may be output at a speaker associated with the customer device 150.

Referring again to FIG. 5, the customer device 150 receives the message 518 and displays the interface at 520. The customer device 150 then receives, at 522, input via the interface. The input may be a response to the prompt 806. The customer device 150 then sends a message 524 to the touchless transfer server 100. The message 524 includes the response to the prompt.

The touchless transfer server 100 may then send an indication of the response to the prompt to the point-of-sale terminal to allow for completion of the transaction based on the response at the point-of sale through use of a physical token at the POS terminal 110. In some implementations, the touchless transfer server 100 may push the indication of the response to the prompt to the appropriate point-of-sale terminal (e.g., using an identifier such as the point-of-sale identifier or transaction identifier to identify the appropriate POS terminal). In other implementations, the indication of the response to the prompt may be provided using a pull technique. For example, the POS terminal may send a message 528 to the touchless transfer server 100. The message 528 is a request for an indication of the response to the prompt. The request may be sent periodically (e.g., the POS terminal 110 may repeatedly attempt to retrieve the indication of the response to the prompt from the touchless transfer server 100 until it becomes available) or it may be sent in response to input received (at 526) at an input module of the POS terminal. The input indicates readiness to complete the transaction. For example, it may be that the operator of the POS terminal, who is an employee of the merchant, provides an input at the POS terminal after their customer has indicated that they have finished providing a response to the prompt through the interface 800 provided on the customer device 150. Then, when the POS terminal 110 receives such input, it may send the message 524 requesting the indication of the response to the prompt.

The touchless transfer server 100 then sends the indication of the response to the prompt in a message 530. The indication of the response to the prompt may indicate one or both of the optional amount or the total amount (i.e., the amount that includes both the base amount and the optional amount) to allow the point-of-sale terminal to indicate that the transaction is to be for the total amount prior to completing the transaction using the physical token.

In some instances, the indication of the response to the prompt may be sent to the POS terminal based on an identifier such as the POS identifier and/or the transaction identifier. One or both such identifiers may be included in the message 528 and used by the touchless transfer server 100 to identify the appropriate response to the prompt to be used to provide the message 530.

The POS terminal 110 receives the message 530 (and thus, the indication of the response to the prompt) and displays, at 532, a transaction completion prompt based on the indication of the response. The transaction completion prompt prompts for completion of the transaction through use of a physical token at the physical token reader. The transaction completion prompt may display the total amount of the transaction (i.e., the amount that includes the base amount and any optional amount). By way of example, the transaction completion prompt may be: "The total amount of your transaction is $149.70. Tap your card to pay."

The transaction completion prompt may prompt for use of a physical token to complete the transaction. The prompt may prompt the customer to insert a payment card at a physical token reader, to swipe payment card having a magnetic strip and/or to tap a physical token. A physical token may include one or more of: a payment card and a mobile device having a representation of a payment card stored thereon.

A customer may then manipulate their physical token in accordance with the prompt to allow the POS terminal 110 to read the physical token. The POS terminal obtains physical token data from the physical token at 534. Physical token data may include, for example, a PAN, an expiry date, verification data (e.g., a CVV number) and/or a token holder. The token holder may identify an entity that the token was issued to and/or is associated with.

The POS terminal 110 then sends a transaction processing request to an appropriate transfer rail 120 in a message 536. The POS terminal 110 may identify the appropriate transfer rail based on the physical token data and may send the message 536 to the identified transfer rail 120. The transaction processing request may include or be based on the physical token data. The transaction processing request includes an amount of the transaction, which may be the total amount that includes both the base amount and the optional amount obtained through input at the customer device.

The transfer rail 120 then identifies an issuer system 124 to relay the message to based on the physical token data in the message 536. The transfer rail 120 then relays the message to the identified issuer system 124 as a message 538.

The issuer system 124 performs a real-time adjudication procedure based on the message 538 in order to instantly determine whether the transaction is to be approved or declined. Then, the issuer system 124 sends an indication of whether the transaction was approved or declined in a message 540 through the transfer rail 120. The transfer rail 120 then relays this message to the POS terminal 110 as a message 542. The POS terminal then, at 544, displays a transaction result indicator, indicating whether the transaction was approved or declined.

Each of the systems illustrated in FIG. 5 may be considered to perform an associated method. By way of example, the issuer system 124 performs a method that includes the operations described as being performed by the issuer system 124 or a portion thereof, the transfer rail 120 performs a method that includes the operations described as being performed by the transfer rail 120 or a portion thereof, the POS terminal 110 performs a method that includes the operations described as being performed by the POS terminal 110 or a portion thereof, the touchless transfer server 100 performs a method that includes the operations described as being performed by the touchless transfer server 100 or a portion thereof, and the customer device 150 performs a method that includes the operations described as being performed by the customer device 150 or a portion thereof. A memory associated with each of these systems may include computer-executable instructions which, when executed, configure the associated system to perform the associated method, or a portion thereof.

Figure 6:
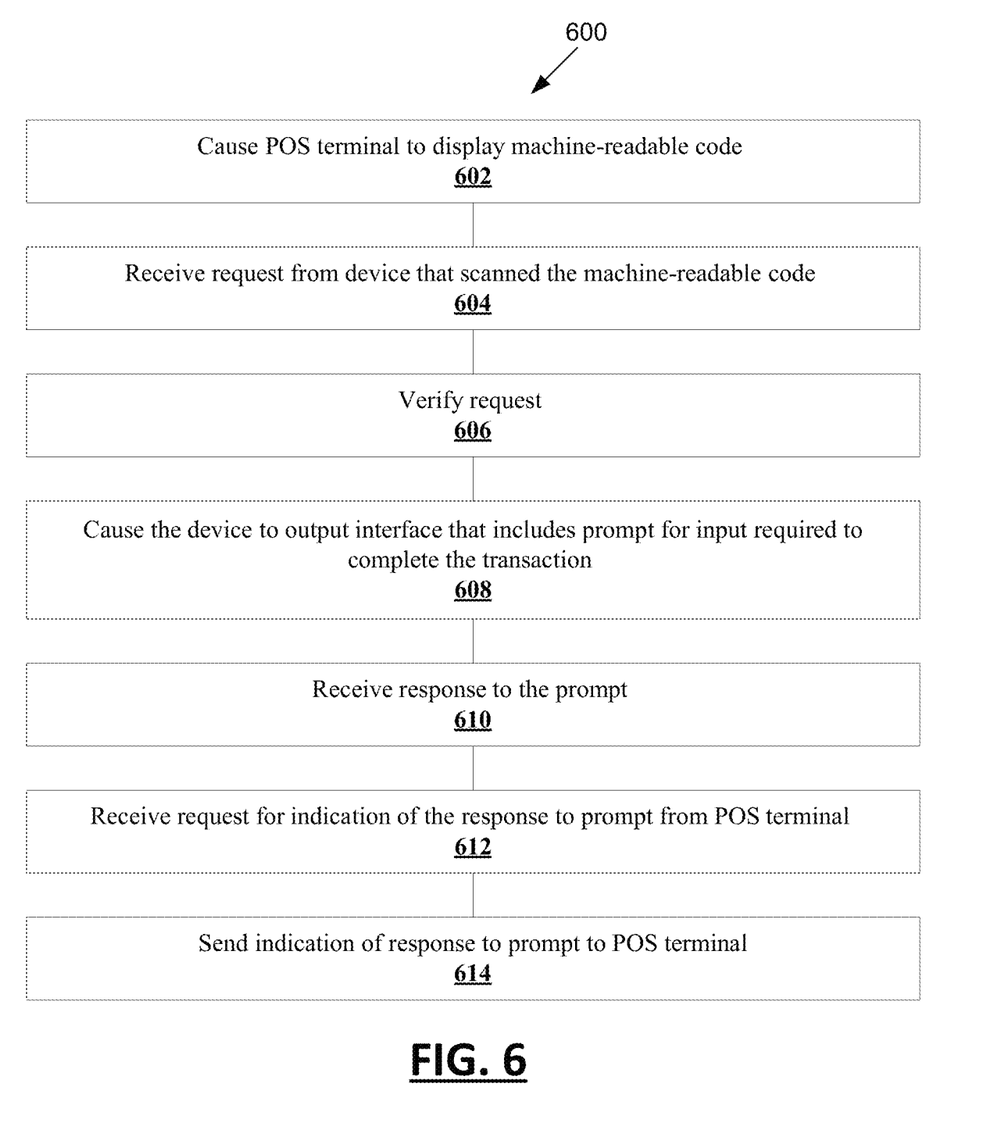
FIG. 6 illustrates, in flowchart form, an example method that may be performed by a server.

By way of example, reference is now made to FIG. 6, which shows, in flowchart form, an example method 600 that may be performed by a touchless transfer server 100. The method 600 may be for obtaining a response to prompts required by a POS terminal using a customer device 150.

Operations starting with operation 602 and continuing onward are performed by the processor 210 (FIG. 2) of a computing device 200 executing software comprising instructions such as may be stored in the memory 220 of the computing device 200. For example, the operations of the method 600 may be performed by the touchless transfer server 100. More particularly, processor-executable instructions may, when executed, configure a processor 210 of the touchless transfer server 100 to perform the method 600. In some embodiments, the operations of method 600 may be performed by the touchless transfer server 100 in conjunction with one or more other computing systems, such as the POS terminal 110 and/or a customer device 150.

The operations 602 and onward may be the same or similar to those described above with reference to the sequence diagram 500 of FIG. 5 and the discussion of the operations 602 and onward will be made by reference to the operations in the sequence diagram 500.

At an operation 602, the touchless transfer server 100 may cause a point-of-sale terminal processing a transaction to display a machine-readable code. The machine-readable code may encode a web address. Operation 602 may be performed in the manner described above with reference to 502 to 510 of the sequence diagram.

Next, at operation 604, the touchless transfer server 100 may receive a request from a device that scanned the machine-readable code. The request may be received at the web address. Operation 604 may be performed as described above with reference to 514 of the sequence diagram 500 of FIG. 5.

Next, at an operation 606, the touchless transfer server 100 may verify the request. Operation 606 may be performed as described above with reference to 516 of the sequence diagram 500 of FIG. 5.

Next, at an operation 608, the touchless transfer server 100 may cause the customer device 150 to output an interface that includes a prompt for input required to complete the transaction. Operation 608 may be performed as described above with reference to 518 of the sequence diagram 500 of FIG. 5.

Next, at an operation 610, the touchless transfer server 100 may receive a response to the prompt. Operation 610 may be performed as described above with reference to 524 of the sequence diagram 500 of FIG. 5.

Next, at an operation 612, the touchless transfer server 100 may receive a request for an indication of the response to the prompt from the POS terminal. Operation 612 may be performed as described above with reference to 528 of the sequence diagram 500 of FIG. 5.

Next, at an operation 614, the touchless transfer server 100 may send an indication of the response to the prompt to the POS terminal. Operation 614 may be performed as described above with reference to 530 of the sequence diagram 500 of FIG. 5.

Figure 7:
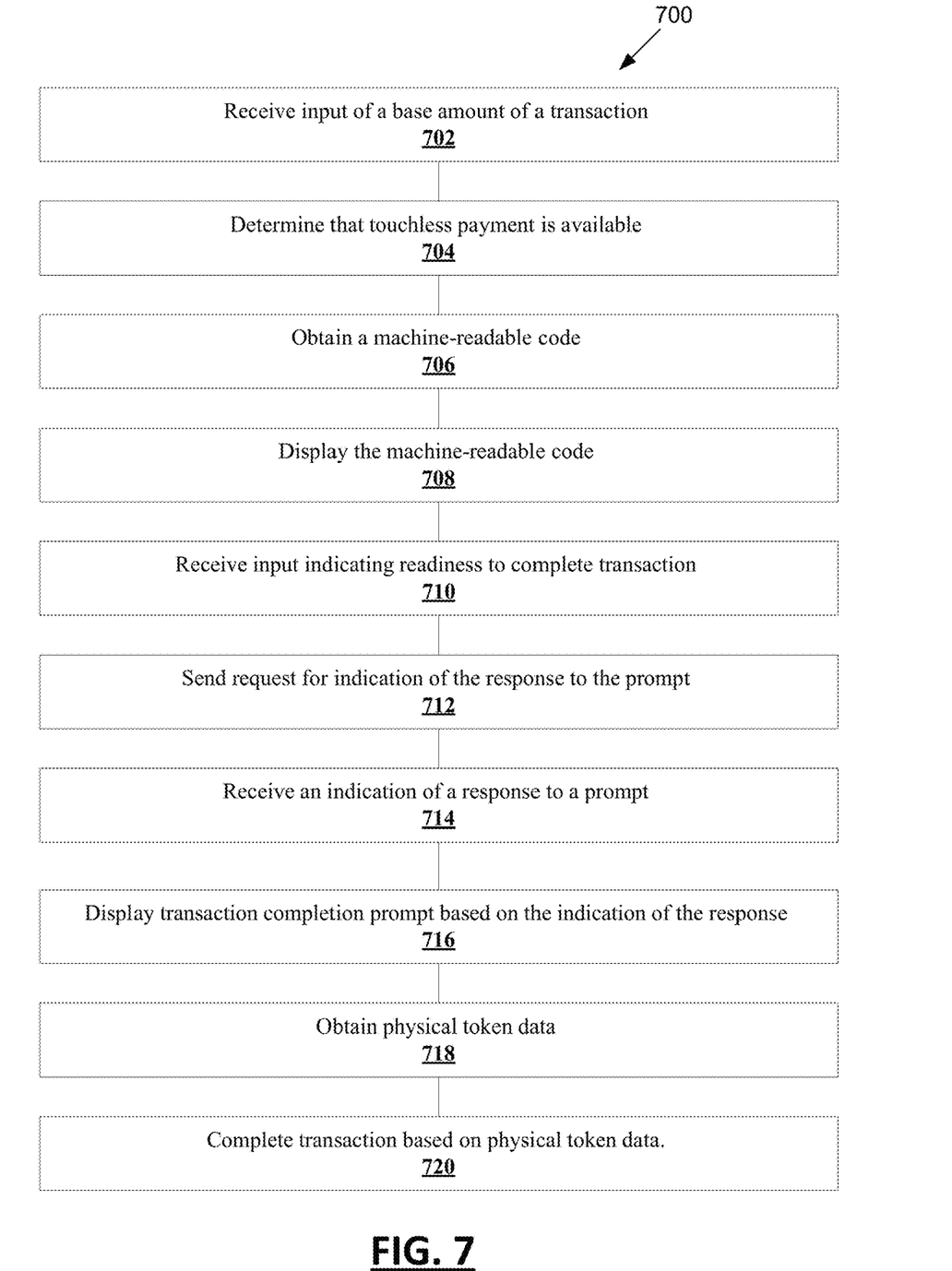
FIG. 7 illustrates, in flowchart form, an example method that may be performed by a point-of-sale terminal.

Reference is now made to FIG. 7, which shows, in flowchart form, an example method 700 that may be performed by a POS terminal 110. The method 700 may be for obtaining a response to prompts required by the POS terminal using a customer device 150.

Operations starting with operation 702 and continuing onward are performed by the processor 210 (FIG. 2) of a computing device 200 executing software comprising instructions such as may be stored in the memory 220 of the computing device 200. For example, the operations of the method 700 may be performed by the POS terminal 110. More particularly, processor-executable instructions may, when executed, configure a processor 210 of the POS terminal 110 to perform the method 700. In some embodiments, the operations of method 700 may be performed by the POS terminal 110 in conjunction with one or more other computing systems, such as the touchless transfer server 100.

The operations 702 and onward may be the same or similar to those described above with reference to the sequence diagram 500 of FIG. 5 and the discussion of the operations 702 and onward will be made by reference to the operations in the sequence diagram 500.

At an operation 702, the POS terminal 110 receives input of a base amount of a transaction. Operation 702 may be performed in the manner described above with reference to 502 of the sequence diagram.

Next, at an operation 704, the POS terminal 110 determines, from the base amount, that touchless payment is available. Operation 704 may be performed in the manner described above with reference to 504 of the sequence diagram.

Next, at an operation 706, the POS terminal 110 obtains a machine-readable code. Operation 706 may be performed in the manner described above with reference to 506 to 508 of the sequence diagram.

Next, at an operation 708, the POS terminal 110 displays the machine-readable code. Operation 708 may be performed in the manner described above with reference to 510 of the sequence diagram.

Next, at an operation 710, the POS terminal 110 receives input indicating readiness to complete the transaction. Operation 710 may be performed in the manner described above with reference to 526 of the sequence diagram.

In response to receiving the input indicating readiness to complete the transaction, the POS terminal 110 may, at operation 712, send a request for an indication of the response to the prompt to the touchless transfer server. Operation 712 may be performed in the manner described above with reference to 528 of the sequence diagram.

Then, at an operation 714, the POS terminal 110 receives an indication of the response to the prompt from the touchless transfer server. Operation 714 may be performed in the manner described above with reference to 530 of the sequence diagram.

At an operation 716, the POS terminal 110 then displays a transaction completion prompt. Operation 716 may be performed in the manner described above with reference to 532 of the sequence diagram.

At an operation 718, the POS terminal 110 obtains physical token data from a physical token. Operation 718 may be performed in the manner described above with reference to 534 of the sequence diagram.

Then, at operation 720, the POS terminal 110 completes the transaction based on the physical token data. Operation 720 may be performed in the manner described above with reference to 536 to 544 of the sequence diagram.

Conveniently, at least some methods and systems described herein may work with numerous types of customer equipment since the customer device 150 need only have the ability to scan a machine-readable code and a web browser to cooperate with other components described herein.

Further conveniently, at least some methods and systems described herein may be deployed through a software update to existing POS terminals without having to obtain all new POS terminals.

Further conveniently, at least some method and systems described herein may be the same irrespective of payment method. For example, a customer could pay using any payment card and the experience remains the same. That is, the customer could use their customer device 150 to input the responses to the prompts and may afterwards determine whether they wish to use credit card or debit card. The experience is the same irrespective of which card they select.

Further conveniently, at least some methods and system described herein may allow customers to store, on their own customer device, preferences for a particular merchant that may be used to auto-populate responses to prompts for a transaction with that particular merchant. For example, a cookie could be stored on the customer device which may be used to track customer preferences. The cookie may be stored on the customer's device such that the next time they visit the contactless payment URL, the cookie may be retrieved and used to identify preferences. For example, a tip amount may be automatically populated with a last tip amount.

At least some methods and systems described herein may also be used, for example, to aid visually impaired users. As noted above, such customers may be presented with voice prompts instead of visual prompts on their customer device.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A server comprising:
a communications module;
a processor coupled with the communications module; and
a memory coupled to the processor and storing processor-executable instructions which, when executed by the processor, configure the server to:
receive, from a point-of-sale terminal processing a transaction, an indication of a base amount of the transaction;
determine, based on the base amount of the transaction, that touchless payment is available;
in response to determining that touchless payment is available, cause the point-of-sale terminal to display a machine-readable code, the machine-readable code encoding a web address;
receive a request from a device that scanned the machine-readable code, the request received at the web address;
in response to receiving the request, cause the device that scanned the machine-readable code to output an interface that includes a prompt for input required to complete the transaction wherein the prompt is for input of an optional amount to be added to a base amount to obtain a total amount prior to completing the transaction;
receive a response to the prompt; and
send an indication of the response to the prompt to the point-of-sale terminal to allow for completion of the transaction based on the response at the point-of-sale terminal through use of a physical token at the point-of-sale terminal.

2. The server of claim 1, wherein the machine-readable code encodes a base amount of a transaction and wherein the request from the device references the base amount of the transaction and the interface indicates the base amount of the transaction.

3. The server of claim 1, wherein the machine-readable code encodes a transaction identifier and wherein the request from the device references the transaction identifier, and wherein the indication of the response to the prompt is sent to the point-of-sale terminal based on the transaction identifier.

4. The server of claim 1, wherein the machine-readable code further encodes a hash and a digital signature and wherein the request further includes the hash and the digital signature and wherein the instructions further cause the server to verify the request based on the hash and the digital signature.

5. The server of claim 4, wherein the machine-readable code further encodes random data and wherein the request further includes the random data and wherein the instructions further cause the server to verify that the request is not associated with a replay attack based on the random data.

6. The server of claim 1, wherein the physical token includes one or more of: a payment card and a mobile device having a representation of a payment card stored thereon.

7. The server of claim 1, wherein the indication of the response to the prompt indicates one or both of the optional amount or the total amount to allow the point-of-sale terminal to indicate that the transaction is to be for the total amount prior to completing the transaction using the physical token.

8. The server of claim 1, wherein the interface that includes the prompt generates the prompt audibly to assist a visually-impaired operator of the device.

9. The server of claim 1, wherein the instructions further configure the server to:
receive, from the point-of-sale terminal, a request for the indication of the response to the prompt and wherein the server sends the indication of the response to the prompt to the point-of-sale terminal in response to receiving the request for the indication of the response to the prompt.

10. A method comprising:
receiving, from a point-of-sale terminal processing a transaction, an indication of a base amount of the transaction;
determining, based on the base amount of the transaction, that touchless payment is available;
in response to determining that touchless payment is available, causing the point-of-sale terminal to display a machine-readable code, the machine-readable code encoding a web address;
receiving a request from a device that scanned the machine-readable code, the request received at the web address;
in response to receiving the request, causing the device that scanned the machine-readable code to output an interface that includes a prompt for input required to complete the transaction, wherein the prompt is for input of an optional amount to be added to a base amount to obtain a total amount prior to completing the transaction;
receiving a response to the prompt; and
sending an indication of the response to the prompt to the point-of-sale terminal to allow for completion of the transaction based on the response at the point-of-sale terminal through use of a physical token at the point-of-sale terminal.

11. The method of claim 10, wherein the machine-readable code encodes a base amount of a transaction and wherein the request from the device references the base amount of the transaction and the interface indicates the base amount of the transaction.

12. The method of claim 10, wherein the machine-readable code encodes a transaction identifier and wherein the request from the device references the transaction identifier, and wherein the indication of the response to the prompt is sent to the point-of-sale terminal based on the transaction identifier.

13. The method of claim 10, wherein the machine-readable code further encodes a hash and a digital signature and wherein the request further includes the hash and the digital signature and wherein the method further includes verifying the request based on the hash and the digital signature.

14. The method of claim 13, wherein the machine-readable code further encodes random data and wherein the request further includes the random data and wherein the method further includes verifying that the request is not associated with a replay attack based on the random data.

15. The method of claim 10, wherein the physical token includes one or more of: a payment card and a mobile device having a representation of a payment card stored thereon.

16. The method of claim 10, and wherein the indication of the response to the prompt indicates one or both of the optional amount or the total amount to allow the point-of-sale terminal to indicate that the transaction is to be for the total amount prior to completing the transaction using the physical token.

17. The method of claim 10, wherein the interface that includes the prompt generates the prompt audibly to assist a visually-impaired operator of the device.

18. The method of claim 10, further comprising:
receiving, from the point-of-sale terminal, a request for the indication of the response to the prompt and wherein the indication of the response to the prompt is sent to the point-of-sale terminal in response to receiving the request for the indication of the response to the prompt.

\* \* \* \* \*